Figure 1:
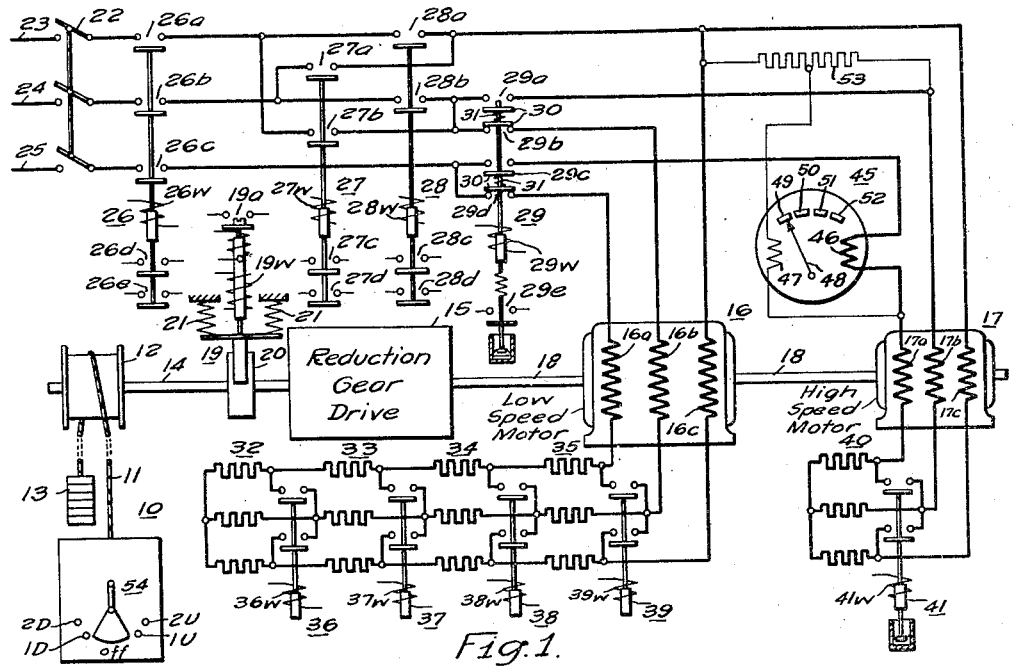

July 7, 1936.  E. M. BOUTON ET AL  2,046,721
ELEVATOR CONTROL SYSTEM
Filed Feb. 28, 1935  2 Sheets-Sheet 1

WITNESSES:
E. A. M'Closkey
R R Lockwood

INVENTORS
Edgar M. Bouton and
Harold W. Williams.
BY
ATTORNEY

Patented July 7, 1936

2,046,721

UNITED STATES PATENT OFFICE 2,046,721

ELEVATOR CONTROL SYSTEM

Edgar M. Bouton and Harold W. Williams, Chicago, Ill., assignors to Westinghouse Electric Elevator Company, Chicago, Ill., a corporation of Illinois Application February 28, 1935, Serial No. 8,643

26 Claims. (Cl. 172—152)

Our invention relates generally to electric elevators and it has particular relation to control systems therefor.

In certain instances, it is desirable to use a two speed elevator system rather than a system in which the speed is variable over a wide range. In a system of this type, the control apparatus is relatively simple and the motive apparatus for driving the car is comparatively inexpensive. Such a system may be used where an elevator is infrequently used or where the extremely smooth operation of elevator systems, such as the variable voltage type, is not required.

In the past, two speed elevator systems have been constructed employing an alternating current motor having a stator provided with a double winding. One of the windings is wound for a small number of poles and the other winding is wound for a large number of poles. Ordinarily, a squirrel-cage rotor is used. When changing from one speed to another, with the usual arrangement of windings, it is necessary to disconnect one winding entirely from the power source and then connect the other winding for energization thereto. During this transition period, no torque is applied to the rotor and as a result, a shock is transmitted to the elevator car. Due to the arrangement of the windings in mutual inductive relation, it is not possible to energize one winding before the other is deenergized. If such a switching sequence is employed, in effect, a short circuit will be applied to the system.

It has also been the practice to utilize the low speed winding of the motor to provide for dynamically braking it in order to reduce the speed of the elevator car from the high speed to the speed at which the low speed motor is arranged to operate. The dynamic braking characteristic of the low speed winding, however, was fixed once and for all, and was the same regardless of the load which had previously been driven by means of the high speed winding.

As is customary, an automatically applied brake is provided for stopping the car in the hatchway. An electro-magnetic releasing winding is provided for releasing the brake when the motors are energized and which is arranged to be deenergized to permit the application of the brake when the motors are deenergized. It is well understood that the speed of application of the brake depends upon the discharge rate of the releasing winding, that is, the higher the discharge rate, the faster will the brake be applied. In the past, the discharge rate of the releasing winding has been varied as a function of the load carried by the elevator car. When a two motor type of elevator system is provided, it is desirable to have a different operation of the brake, depending upon whether the elevator car is stopped from the high speed as driven by the high speed motor, or from the low speed as driven by the low speed motor. If such action is not provided, the operation of the car in stopping may seem to the operator and passengers as if the control of it has been lost momentarily.

Therefore, it is an object of our invention to provide a system for controlling the operation of a two speed two motor elevator system which shall be simple and efficient in operation and which may be readily and economically manufactured and installed.

An important object of our invention is to provide a smooth transition from one speed to another in the operation of an elevator car arranged to be driven by either of two motors.

Another object of our invention is to provide for simultaneously energizing two motors arranged to operate an elevator car at different speeds during the transition period from one speed to the other.

Another important object of our invention is to provide for dynamically braking the low speed motor of a pair of motors arranged to drive an elevator car at different speeds in accordance with the load carried by the car.

Another object of our invention is to provide for varying the resistance connected in series circuit relation with the windings of the low speed motor of a pair of motors arranged to drive an elevator car at different speeds in accordance with the power supplied to the high speed motor before it is deenergized in order to vary the dynamic braking characteristics of the low speed motor.

Another important object of our invention is to provide for setting an elevator brake to stop the elevator car operated by a motor before the motor is deenergized.

Another important object of our invention is to provide a different discharge circuit for the operating winding of an elevator brake in an elevator system employing two motors having different speed characteristics, depending upon which motor is deenergized.

Still another object of our invention is to provide for increasing the resistance of the discharge circuit of the brake operating winding in an elevator system employing two motors having different speed characteristics if the operator desires to quickly stop the car when it is operating at high speed.

Other objects of our invention will, in part, be obvious and, in part, appear hereinafter.

Accordingly, our invention is disclosed in the embodiment hereof shown in the accompanying drawings and comprises the features of construction, combination of elements and arrangement of parts which will be exemplified in the construction hereinafter set forth and the scope of the application of which will be indicated in the appended claims.

Figure 2:
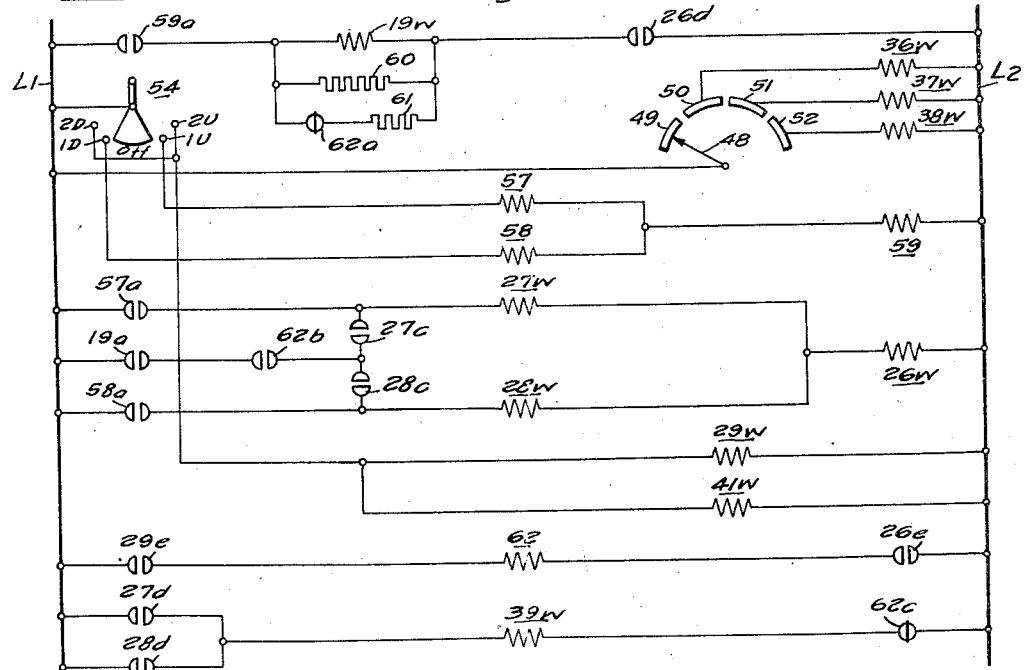
Figure 3:
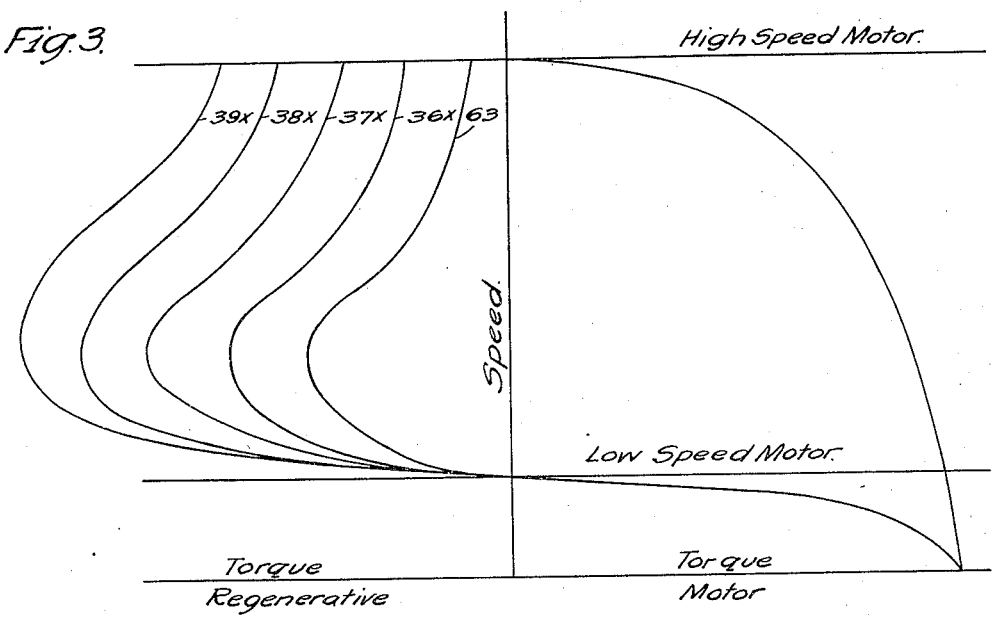
Figure 4:
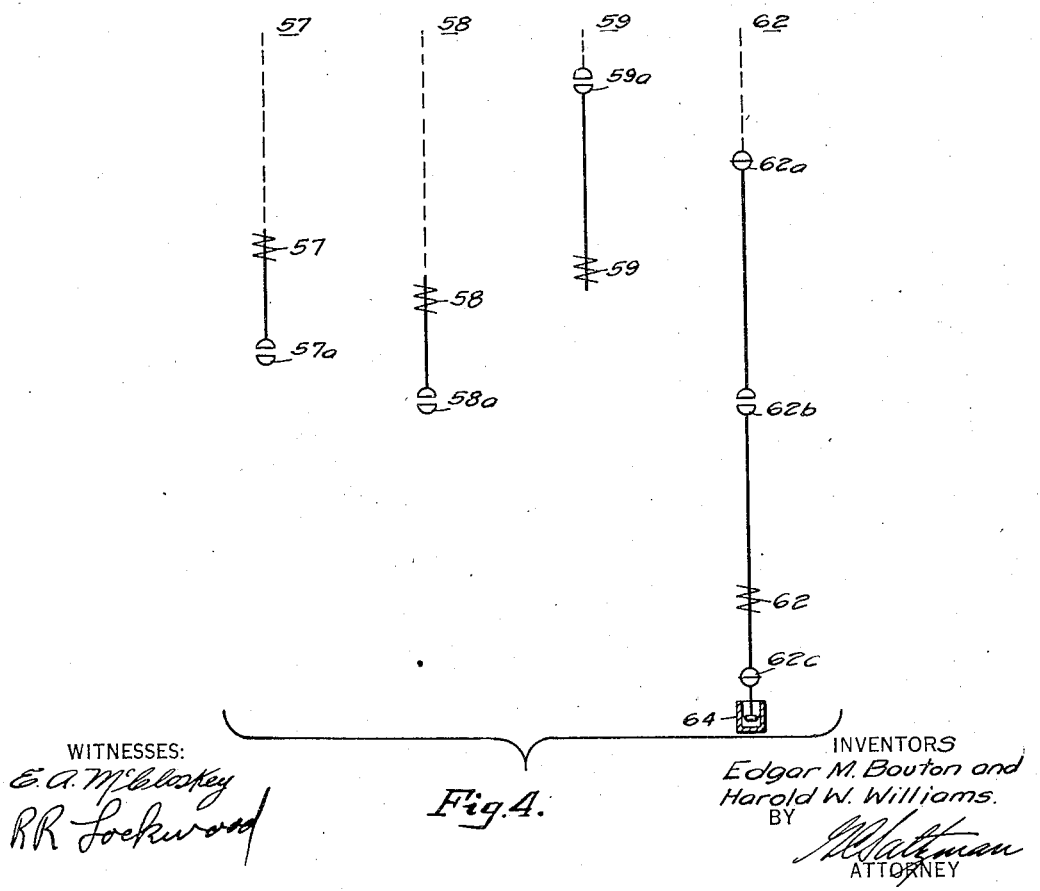

For a more complete understanding of the nature and scope of our invention, reference may be had to the following detailed description taken in conjunction with the accompanying drawings, in which Figure 1 illustrates diagrammatically an elevator system embodying our invention, Fig. 2 illustrates schematically the circuit connections for the control devices illustrated in Fig. 1, Fig. 3 shows a number of curves which demonstrate the characteristics possessed by an elevator system constructed in accordance with our invention, and Fig. 4 illustrates the relative arrangement of the contact members on certain of the relays which are shown in Fig. 2 of the drawings and which are not illustrated in Fig. 1.

According to our invention, an elevator car is provided which is operable in a hatchway in the customary manner. The car is arranged to be driven by either of two alternating current polyphase motors, each of which is provided with a rotor that is mounted on a common shaft which is connected through suitable reduction gearing to operate the elevator car. One of the motors is provided with a large number of poles, and, therefore, operates at a slow speed while the other motor is provided with a small number of poles and operates at a high speed. In order to stop the elevator car when both of the motors are deenergized, a brake is provided which is arranged to be automatically applied by means of springs and to be released by means of a releasing winding.

The elevator car is provided with a control switch which is arranged to permit the operator to select which motor he wishes to operate the car. Thus, for either direction of travel, a low speed position and a high speed position is provided. The low speed is ordinarily used for starting and for inching while the high speed is used for running. The centered position of the control switch is, as is customary, the off position. Thus, when the control switch is centered, neither of the motors will be energized to operate in either direction.

As set forth hereinbefore, it is desirable during the transition period from one motor to another to avoid the shock to the elevator car which is due to the loss of torque caused by no motor being energized during the transition period. We have overcome this difficulty by providing a transfer switch which is arranged to simultaneously connect both motors for energization to the line during the transition period, for example, in switching from the low speed position to the high speed position before the low speed motor is deenergized, the high speed motor is energized. There is, therefore, no loss of torque which would otherwise be the case which will be readily understood.

It is well known that the low speed motor may be used for dynamically braking the elevator car when slowing it down from the high speed to the speed at which the low speed motor is disposed to run. It is desirable, however, to vary the dynamic braking characteristic of the low speed motor in accordance with the load carried by the elevator car. That is, when a heavy load is driven by the high speed motor it is desirable to provide a stronger dynamic braking effect on the part of the low speed motor than is provided if a lighter load is being driven by the high speed motor. It is then possible to take advantage of different dynamic braking characteristics of the low speed motor in order to provide for decelerating the elevator car at a uniform rate regardless of the load which is carried thereby.

In order to vary the dynamic braking characteristics of the low speed motor, a plurality of braking resistors are provided in series circuit relation with the stator windings thereof. Dynamic braking switches are provided for short circuiting portions of the braking resistors for the purpose of varying the voltage applied to the windings of the low speed motor during the dynamic braking period. In order to control the dynamic braking switches, a contact making watt-meter is provided to measure the power which is supplied to the high speed motor. It will be understood that the power thus supplied will be a function of the load driven by the high speed motor which, in turn, is a function of the load carried by the elevator car. The wattmeter is arranged to be connected to the power circuit for energization when the high speed motor is energized and to be disconnected therefrom when it is deenergized. The movable contact member of the wattmeter is arranged to remain in the position to which it is operated prior to the deenergization of the high speed motor. The position in which the movable contact member of the wattmeter is left after the high speed motor is deenergized determines which of the dynamic braking switches will be energized.

In certain instances, it is desirable to quickly stop the elevator car when it is operating at the high speed. In order to accomplish this function, the operator may center the control switch from the high speed position without holding it in the low speed position for a time sufficient to permit the dynamic braking effect of the low speed motor to decelerate the elevator car. Under these conditions, it is desirable to provide for setting the brake and insuring that it is set fully before driving torque is removed from the elevator car. For this purpose, the brake is provided with contact members which are delayed in opening after the brake winding has been released. These contact members, in their closed position, complete a holding circuit for maintaining power on one or the other of the motors. Therefore, when the control switch is centered from the high speed position without pausing at the low speed position, driving torque is not removed from the elevator car until after the expiration of a predetermined interval after the releasing winding of the brake is deenergized. The time delay brake contact members are effective to maintain the holding circuit only in the event that the elevator car has been operated by the high speed motor. In the event that it has been operated only by the low speed motor, the holding circuit is not completed.

It will be apparent that it is desirable to provide for setting the brake at the highest possible rate when the control switch is rapidly centered from the high speed position. Such operation is desired since the brake is the sole means which is available for decelerating the elevator car under normal conditions. The rate at which the brake may be set depends to a large extent upon the rate at which the releasing winding thereof is discharged when it is disconnected from the energizing circuit. Ordinarily, a discharge circuit comprising a resistor is provided in shunt circuit relation with the brake winding in order to provide for discharging it so that the brake may be applied by the brake springs.

It will be understood that the rate at which the brake winding will be discharged depends upon the resistance which is connected in circuit therewith, that is, the higher the resistance, the faster will be the discharge. According to our invention, we provide two resistors which are arranged to be connected in parallel circuit relation and in shunt circuit relation to the brake winding. Normally closed circuit members are provided in series circuit relation with one of the resistors so that a comparatively low resistance discharge path is provided around the brake winding. As a result, the discharge rate thereof will be low and the brake action will be sluggish.

When the elevator car is operated by the high speed motor, circuits are completed for energizing an operating winding, that is effective to open the normally closed contact members which are connected in series circuit relation with one of the discharge resistors. When the control switch is rapidly centered from the high speed position, these contact members are held in the open position for a predetermined time thereby causing a high resistance discharge circuit to be provided for the brake winding with the result that the brake is applied much more rapidly, than would be the case if the brake winding were permitted to discharge through the resistors in parallel. It will be understood that this sequence of operation is effective only when rapidly switching from the high speed position to the off position and that the comparatively low resistance discharge path is provided when the elevator car is to be stopped after it has been operated at the low speed.

Referring now particularly to Fig. 1 of the drawings, the reference character 10 designates generally an elevator car which is operable in a hatchway in the usual manner. The elevator car 10 may be supported by means of a cable 11 which is passed over a sheave 12 and attached to a suitable counterweight 13. As illustrated, the sheave 12 is mounted on a shaft 14 which is connected to a suitable reduction gear drive shown generally at 15. The reduction gear drive may be driven by means of a low speed polyphase motor of the squirrel-cage type 16 having stator windings 16a, 16b and 16c. The reduction gear drive 15 is also arranged to be driven by means of a high speed polyphase induction motor of the squirrel-cage type 17 having stator windings 17a, 17b and 17c. The rotors of the motors 16 and 17 may be mounted on a common shaft 18 which is connected to the reduction gear drive 15.

It will be understood that the low speed motor 16 is provided with a comparatively large number of poles, for example, twenty-four, while the high speed motor 17 is provided with a comparatively small number of poles such as eight. It will, therefore, be understood that the high speed motor will drive the elevator car 10 at three times the speed that it will be driven by the low speed motor 16.

In order to stop the elevator car 10 when the motors 16 and 17 are deenergized, a brake shown generally at 19 is provided. As illustrated, the brake 19 is provided with a shoe which is arranged to engage a brake wheel 20 that is mounted on the shaft 14. The brake shoe may be applied by means of springs 21. A releasing winding 19w is provided for moving the brake shoe against the force of springs 21. The circuit connections for energizing the brake winding 19w are illustrated in Fig. 2 of the drawings.

It will be observed that the brake 19 is provided with contact members 19a which are arranged to be bridged as soon as the releasing winding 19w is energized, but which are provided with a certain amount of lost motion to delay the opening thereof until after the releasing winding 19w is deenergized and the brake is initially applied to the brake wheel 20. The functioning of these contact members will be set forth in detail hereinafter.

In order to energize the motors 16 and 17, a manually operable main switch 22 is provided which is arranged to connect the system to a three-phase source of alternating current which may be represented by the conductors 23, 24 and 25. An electro-magnetically operated line switch 26 is provided for connecting the system to the power source when the switch 22 is closed. Reversing switches 27 and 28 are provided for operating the motors 16 and 17 in either direction of rotation, depending upon whether it is desired to move the elevator car 10 in the up or the down direction.

With a view to transferring the operation of the elevator car from the low speed motor 16 to the high speed motor 17 or the reverse, a transfer switch shown generally at 29 is provided. In the deenergized position, the transfer switch 29 is arranged to connect the low speed motor 16 to be energized. When the transfer switch 29 is energized circuits are completed for effecting the energizing of the high speed motor 17. The bridging contact members 30 of the transfer switch 29 may be slidably arranged on the operating mechanism and may be biased apart between contact members 29a and 29b and between contact members 29c and 29d by means of springs 31. When the operating winding 29w of the transfer switch 29 is energized, the contact members 29a and 29c are bridged before contact members 29b and 29d are opened. During this interval, both of the motors 16 and 17 are energized with the result that there is no loss of torque as applied to the shaft 18. The reverse functioning is true when the operating winding 29w is deenergized.

It will be understood that the particular construction of the transfer switch 29 is shown for illustrative purposes only and that it may be modified without departing from the scope of our invention. In order to practice our invention, it is only necessary to provide some control system whereby both motors are momentarily connected for energization during the transition period from operation by one to operation by the other.

In order to vary the dynamic braking characteristics of the low speed motor 16, braking resistor sections 32, 33, 34 and 35 are provided.

While the sections 32, 33, 34 and 35 have been illustrated as resistor sections, it will be readily understood that other impedance devices such as inductors may be used. Each of these sections comprises three resistors, as illustrated. The corresponding resistors of the various sections are connected in series circuit relation and in series circuit relation with the stator windings 16a, 16b and 16c. The left-hand terminals of the resistors comprising the section 32 are connected together thereby providing a star connection. The various resistor sections may be, respectively, short circuited by means of dynamic braking switches 36, 37 and 38 and by an inching speed switch 39.

The high speed motor 17 is provided with an accelerating resistor section 40 comprising three resistors which are arranged to be connected in series circuit relation with the stator windings 17a, 17b and 17c. Accelerating switch 41, having a time delay in closing, is provided for short circuiting the accelerating resistors 40 a predetermined time after the high speed motor 17 has been energized.

The power which is supplied to the high speed motor 17 may be measured by means of a wattmeter 45 provided with a current winding 46 and a voltage winding 47, both of which are arranged to cooperate to move a contact member 48 to a position corresponding to the power supplied to the high speed motor 17. As illustrated, the contact member 48 is arranged to engage one of the contact segments 49, 50, 51 or 52, depending upon the power which is supplied to the high speed motor 17. As illustrated in Fig. 2 of the drawings, the contact segments 50, 51 and 52 are connected, respectively, to the operating windings 36w, 37w and 38w of the dynamic braking switches 36, 37 and 38, respectively. The contact member 48 is arranged to always be in engagement with one of the contact segments so that at all times either none of the operating windings 36w, 37w and 38w is energized when the contact member 48 is in engagement with the contact segment 49 or one of them is energized when the contact member 48 is in the range covered by the contact segments 50, 51 and 52.

As illustrated, the current winding 46 is connected in series circuit relation with one of the energizing conductors to the high speed motor 17 while the voltage winding 47 is connected between this conductor and the mid-point of a resistor 53 which is connected between the other two energizing conductors.

The elevator car 10 is provided with a control switch 54 which may be operated by the operator. The control switch 54 is provided with a central or off position and two positions for either direction of travel. Thus, for the up direction of travel, when the control switch 54 is operated to engage contact members 1U, the elevator car 10 will be operated upwardly at the slow speed. If the control switch is operated to engage not only contact members 1U but also contact members 2U, then elevator car 10 will be operated upwardly at high speed. In like manner, contact members 1D and 2D are provided for operating the elevator car downwardly at corresponding speeds.

Referring now particularly to Fig. 2 of the drawings, it will be observed that up and down control relays 57 and 58 are provided which are arranged to be selectively operated by means of the control switch 54. In series circuit relation with the operating windings of the control relays 57 and 58 is connected the operating winding of a brake control relay 59, which is arranged to partly complete an energizing circuit for the releasing winding 19w of the brake 19.

As illustrated, the brake winding 19w has provided in shunt circuit relation therewith resistors 60 and 61 which are connected in parallel circuit relation with each other. A brake discharge control relay 62 is provided having normally closed contact members 62a, which are connected in series circuit relation with resistor 61. It will be understood that when the operating winding of the brake discharge control relay 62 is deenergized, contact members 62a are closed thereby providing a discharge path of low resistance for the releasing winding 19w. When these contact members are opened, a discharge path of high resistance is provided and the brake winding 19w is deenergized much more rapidly.

In describing the operation of our new elevator system, it will be assumed that the main switch 22 is closed and that line conductors 23, 24 and 25 are energized from a suitable source of alternating current. It will also be assumed that the operator desires to inch the car 10 or to move it at the slow speed in the up direction. For this purpose, the operator moves the control switch 54 to engage the contact members 1U. As a result, a circuit between energized conductors L1 and L2 is completed for energizing the operating winding of the up control relay 57 and the brake control relay 59.

L1, 1U, 57, 59, L2

The energization of up control relay 57 completes a circuit for energizing the operating windings of up reversing switch 27 and line switch 26.

L1, 57a, 27w, 26w, L2

The brake winding 19w is then energized by the closure of contact members 26d over a circuit which had previously been partly completed by the closure of contact members 59a.

L1, 59a, 19w, 26d, L2

At the same time that the brake 19 is released, the low speed motor 16 is energized due to the operation of the line switch 26 and the up reversing switch 27. In addition, the inching speed switch 39 is operated to short circuit all of the sections of the braking resistors and full voltage is then applied to the winding of the low speed motor 16.

L1, 27d, 39w, 62c, L2

It then operates the elevator car 10 at the slow speed.

When it is desired to stop further movement of the elevator car 10, the operator centers the control switch 54, thereby deenergizing the operating winding of the up control relay 57 and the brake control relay 59. The operating windings 27w and 26w of the up reversing switch 27 and line switch 26, respectively, are deenergized and the motor 16 is disconnected from the line. At contact members 59a, the energizing circuit for the releasing winding 19w of the brake 19 is opened and the brake 19 is applied. Due to the fact that the high speed position was not reached in the foregoing sequence of operations, the low resistance discharge path is provided around the releasing winding 19w of the brake 19 and the brake is relatively slow in setting. This functioning is desirable, however, in view of the fact that the elevator car 10 is operating at low speed and sufficient braking action will be applied to stop it at the desired location and at a rate which will afford a minimum of shock.

In the event that the operator wishes to operate the elevator car 10 at the high speed, he may immediately move the control switch 54 so that not only contact members 1U will be engaged but also contact members 2U will be engaged. The foregoing sequence of operation for energizing the low speed motor 16 will take place. However, due to the engagement with contact members 2U, a circuit will be completed for energizing the operating windings 29w and 41w of the transfer switch 29 and the accelerating switch 41 respectively, and the low speed motor 16 will not, under normal conditions be energized.

L1, 2U, 29w and 41w in parallel, L2

The operation of the transfer switch 29 will immediately complete the energizing circuit for the high speed motor 17 and at the same time the wattmeter 45 will be energized.

Had the operator first moved the control switch 54 to engage the contact members 1U only, the elevator car would have been brought up to the speed at which the slow speed motor 16 is adapted to drive it, as set forth hereinbefore. The successive operation of the control switch 54 to engage contact members 2U would then effect the operation of the transfer relay 29 to energize the high speed motor 17. Due to the particular construction and arrangement of the bridging contact members 30 of the transfer switch 29, the high speed motor 17 would be connected for energization before the low speed motor 16 was deenergized as will be readily understood.

At the expiration of a predetermined time after the operating winding 41w is energized, the accelerating switch 41 will be operated to short circuit the accelerating resistor section 40, thereby applying full voltage to the high speed motor 17 and causing it to operate at maximum speed.

Since the system is now operating at the maximum speed and the transfer switch 29 is energized, a circuit is completed for energizing the operating winding of the brake discharge control relay 62.

L1, 29e, 62, 26e, L2.

It will now be apparent that a holding circuit is also completed on operation of the control relay 62 for the windings 27w and 26w.

L1, 19a, 62b, 27c, 27w, 26w, L2.

It will be assumed that the power supplied to the high speed motor 17 is such as to cause the contact member 48 of the wattmeter 45 to engage the contact segment 51 thereby completing an obvious energizing circuit for the operating winding 37w of the dynamic braking switch 37. The dynamic braking switch 37 then serves to short circuit the braking resistor sections 32 and 33. No further action takes place, however, due to the fact that the low speed motor 16 is not energized at this time. It will be recalled that the inching speed switch 39 will not be operated due to the fact that the energizing circuit for its operating winding 39w will be opened at contact members 62c since the brake discharge control relay 62 is energized.

Under normal operating conditions when the operator wishes to decrease the speed of upward travel of the car 10 to the slow speed in the course of stopping it, he will move the control switch 54 to engage only the contact members 1U. As a result, the operating winding 29w of the transfer switch 29 is deenergized and the low speed motor 16 is energized. The operating winding 41w of the accelerating switch 41 will be deenergized and the accelerating resistor section 40 will be reinserted in series circuit relation with stator windings of the high speed motor 17.

Since the speed of the low speed motor 16 is at this time well above its synchronous speed, it will serve as a dynamic brake to reduce the speed of the elevator car 10 to the speed at which it is adapted to operate. The speed torque relationship during this period may be illustrated by the curve 37x shown in Fig. 3 of the drawings. The regenerative torque which is applied for reducing the speed of the elevator car 10 will be as indicated by this curve. In the event that any of the other dynamic braking switches 36 or 38 had been energized, the corresponding speed torque relation as shown by curves 36x and 38x, respectively, would be obtained. When the inching speed switch 39 is energized during this interval, the speed torque relationship under this operating condition is illustrated by the curve 39x. If the contact member 48 is in engagement with the contact segment 49 of the wattmeter 45, then none of the switches 36, 37, 38 and 39 will be energized and the minimum dynamic braking effect will be provided by the low speed motor 16. This relationship is illustrated by the speed torque curve 63.

After the expiration of a predetermined time after the transfer switch 29 is deenergized, contact members 29e will be opened, thereby deenergizing the control relay 62. In the event that sufficient dynamic braking torque has not been applied before contact members 62c, provided with a dashpot 64, set for a relatively long time, such as three seconds, are closed, the inching speed switch 39 will be operated to short circuit all of the dynamic braking resistors and the maximum dynamic braking effect will be provided by the low speed motor 16 to reduce the speed thereof to its synchronous speed.

If it is now desired to stop the elevator car 10, the control switch 54 may be centered to the off position. As a result, the low speed motor 16 will be deenergized and the brake 19 will be applied, as set forth hereinbefore.

Assuming now that the operator wishes to rapidly stop the upward movement of the elevator car 10, when it has been operating at the high speed, he may rapidly center the control switch 54 without pausing at the low speed position to take advantage of dynamic braking characteristics of the low speed motor 16. Under these conditions, the brake 19 is the only means which is normally effective to stop the elevator car 10. As a result, it is desirable, as set forth hereinbefore, to apply maximum braking action.

It will be recalled that the brake discharge control relay 62 was energized on energization of the transfer switch 29 by the closure of contact members 29e. These contact members are provided with a time delay in opening which may be of the order of one-half of a second so that the brake discharge control relay 62 will remain energized during this interval. As a result, contact members 62a remain open during this interval and only discharge resistor 60 is connected in shunt circuit relation with the releasing winding 19w. The brake winding 19w discharges at the maximum rate allowable under the circuit conditions, which are provided and the brake 19 is set at the maximum speed. When the contact members 29e finally are opened and the brake discharge control relay 62 deenergized, the brake winding 19w will have been completely discharged so that the closing of the contact member 62a will then have no effect.

It will also be recalled that the operation of the brake discharge control relay 62 completed a holding circuit for the operating winding 27w and 26w of the up reversing switch 27 and line switch 26, respectively. As a result, even though the up control relay 57 is deenergized, the up reversing switch 27 and line switch 26 will remain in their operated positions.

After the brake winding 19w is deenergized due to the opening of contact members 59a, the contact members 19a are opened because of the lost motion connection, thereby opening the holding circuit which was completed by the contact members 62b and permitting the line switch 26 and the up reversing switch 27 to be positioned in the non-operated position. During this interval, while the brake 19 is being set, one of the motors 16 or 17 will be energized, depending on the rapidity of action of the transfer switch 29, and as a result torque will be continually applied to the shaft 18 until the brake 19 is firmly set. There will then be no feeling on the part of the operator or passenger of a loss of control of the elevator car 10.

Since certain further changes may be made in the foregoing construction and different embodiments of the invention may be made without departing from the scope thereof, it is intended that all matter set forth in the foregoing description or shown in the accompanying drawings shall be interpreted as illustrative and not in a limiting sense.

We claim as our invention:

1. In a control system, in combination, a load device operable at different speeds, a pair of alternating current motors having driving connection with said load device, said motors being individually disposed to drive said load device at different speeds, and switch means for connecting said motors to a source of alternating current, said switch means being disposed to connect one motor to said source before the other motor is disconnected therefrom.

2. In a control system, in combination, a load device operable at different speeds, a pair of alternating current motors having different numbers of poles each individually disposed to drive said load device through a single drive shaft, and switch means for sequentially connecting said motors to a source of alternating current, said switch means being disposed to connect one motor in parallel circuit relation with the other motor to said source before said other motor is disconnected therefrom.

3. In a control system, in combination, a load device operable at different speeds, a pair of alternating current motors having different numbers of poles each individually disposed to drive said load device through a single drive shaft, switch means for individually connecting said motors to a source of alternating current, and means for connecting one of said motors to said source before the other motor is disconnected therefrom.

4. In a control system for operating an elevator car in a hatchway at different speeds, in combination, a pair of alternating current motors having rotors mounted on a common shaft operatively connected to said elevator car, said motors being provided with stators having different numbers of poles for individually operating said elevator car at different speeds depending upon which stator is energized, and switch means for sequentially connecting said stators to a source of alternating current, said switch means being disposed to connect one stator to said source before the other stator is disconnected therefrom, thereby providing a smooth transition from one operating speed to the other operating speed.

5. In a control system for operating an elevator car in a hatchway at different speeds, in combination, a pair of alternating current motors having rotors mounted on a common shaft operatively connected to said elevator car, said motors being provided with stators having different numbers of poles for individually operating said elevator car at different speeds depending upon which stator is energized, switch means for individually connecting said stators to a source of alternating current, and means for connecting one of said stators to said source before the other stator is disconnected therefrom whereby a smooth transition from one operating speed to the other operating speed is provided.

6. In a control system, in combination, a load device operable at different speeds, a pair of alternating current motors having driving connection with said load device for driving it at different speeds, and means for dynamically braking the lower speed motor at a rate depending upon the load driven by the higher speed motor.

7. In a control system, in combination, a load device operable at different speeds, a high speed alternating current motor having a small number of poles and a low speed alternating current motor having a large number of poles connected to drive said load device through a single drive shaft, means for individually connecting said motors to a source of alternating current, and means for dynamically braking said low speed motor when said high speed motor is disconnected from said source at a rate depending upon the power supplied to said high speed motor before it is disconnected.

8. In a control system, in combination, a load device operable at different speeds, a high speed alternating current motor having a small number of poles and a low speed alternating current motor having a large number of poles connected to drive said load device through a single drive shaft, means for individually connecting said motors to a source of alternating current, and means including a wattmeter device for dynamically braking said low speed motor when said high speed motor is disconnected from said source at a rate depending upon the power supplied to said high speed motor as measured by said watt meter device before said high speed motor is disconnected.

9. In a control system for operating an elevator car in a hatchway at different speeds, in combination, a high speed and a low speed alternating current motor having respectively a small number and a large number of poles operatively connected to said elevator car, switch means for individually connecting either of said motors to a source of alternating current, wattmeter means disposed to be energized on energization of said high speed motor for measuring the power input thereto, and means for dynamically braking said low speed motor when said high speed motor is disconnected from said source at a rate depending upon the power measured by said wattmeter means before the high speed motor is disconnected from said source of power.

10. In a control system for operating an elevator car in a hatchway at different speeds, in combination, a high speed and a low speed alternating current motor having respectively a small number and a large number of poles operatively connected to said elevator car, switch means for individually connecting either of said motors to a source of alternating current, impedance means disposed to be connected in circuit with said low speed motor for varying the dynamic braking characteristics thereof depending upon the value of impedance connected in circuit with said motor, wattmeter means disposed to be energized on energization of said high speed motor for controlling the connection of said impedance means to said low speed motor in accordance with the power input to said high speed motor before it is disconnected from said source of power, and means for short circuiting said impedance means at the expiration of a predetermined time interval after said high speed motor is disconnected.

11. In a control system, in combination, a load device operable at different speeds, a pair of alternating current motors having driving connection with said load device for operating it at different speeds, switch means for connecting said motors to a source of alternating current and disposed to connect one motor to said source before disconnecting the other therefrom, and means for dynamically braking the lower speed motor at a rate depending upon the load driven by the higher speed motor.

12. In a control system, in combination, a load device operable at different speeds, a pair of alternating current motors having different numbers of poles disposed to drive said load device through a single drive shaft, switch means for sequentially connecting said motors to a source of alternating current by connecting one motor to said source before disconnecting the other therefrom, and means for dynamically braking said low speed motor when said high speed motor is disconnected from said source at a rate depending upon the power supplied to said high speed motor before it is disconnected.

13. In a control system, in combination, a load device operable at different speeds, a pair of alternating current motors having different numbers of poles disposed to drive said load device through a single drive shaft, switch means for individually connecting said motors to a source of alternating current, means for connecting one of said motors to said source before the other motor is disconnected therefrom, and means including a wattmeter device for dynamically braking said low speed motor when said high speed motor is disconnected from said source at a rate depending upon the power supplied to said high speed motor as measured by said wattmeter device before said high speed motor is disconnected from said source.

14. In a control system for operating an elevator car in a hatchway at different speeds, in combination, a pair of alternating current motors having rotors mounted on a common shaft operatively connected to said elevator car, said motors being provided with stators having different numbers of poles for operating said elevator car at different speeds depending upon which stator is energized, switch means for sequentially connecting said stators to a source of alternating current by connecting one stator to said source before the other stator is disconnected therefrom thereby providing a smooth transition from one operating speed to the other operating speed, wattmeter means disposed to be energized on energization of the higher speed motor for measuring the power input thereto, and means for dynamically braking the lower speed motor when the higher speed motor is disconnected from said source at a rate depending upon the power measured by said wattmeter means before the higher speed motor is disconnected from said source of power.

15. In a control system for operating an elevator car in a hatchway at different speeds, in combination, a high speed and a low speed alternating current motor having respectively a small and a large number of poles operatively connected to said elevator car, switch means for individually connecting said motors to a source of alternating current, means for connecting one of said motors to said source before the other motor is disconnected therefrom whereby a smooth transition from one operating speed to the other operating speed is provided, resistance means disposed to be connected in circuit with said low speed motor for varying the dynamic braking characteristics thereof depending upon the resistance connected in circuit with said motor, and wattmeter means disposed to be energized on energization of said high speed motor for controlling the connection of said resistance means to said low speed motor in accordance with the power input to said high speed motor before it is disconnected from said source of power.

16. In a control system for an elevator car in a hatchway, in combination, motor means having driving connection with the car for operating it in the hatchway, a brake for holding said car when said motor means is deenergized, means for applying said brake, and means for maintaining said motor means continuously energized until after said brake is initially applied.

17. In a control system for an elevator car in a hatchway, in combination, a high speed and a low speed motor having driving connection with said car for operating it in the hatchway, means for energizing either of said motors, a brake for holding said car when said motors are deenergized, and means for maintaining one of said motors energized until after said brake is initially applied when a control function is initiated to deenergize said high speed motor and stop the car.

18. In a control system for an elevator car in a hatchway, in combination, a high speed and a low speed motor having driving connection with said car for operating it in the hatchway, means for energizing either of said motors, a brake for holding said car when said motors are deenergized, means for applying said brake, and means for maintaining said low speed motor energized until after said brake is initially applied only when a control function is initiated to deenergize said high speed motor and stop the car.

19. In a control system for an elevator car in a hatchway, in combination, a high speed and a low speed motor having driving connection with said car for operating it in the hatchway, means for energizing either of said motors, a brake for holding said car when said motors are deenergized, means for releasing said brake when either of said motors is energized, contact means disposed on release of said brake to partially complete a holding circuit for maintaining one of said motors energized, additional contact means disposed on energization of said high speed motor to complete said holding circuit, and means for maintaining said holding circuit completed until after said brake is initially applied when a control function is initiated to deenergize said high speed motor and stop the car.

20. In a control system for an elevator car in a hatchway, in combination, a high speed and a low speed motor having driving connection with said car for operating it in the hatchway, means for energizing either of said motors, a brake for holding said car when said motors are deenergized, means for releasing said brake when either of said motors is energized, contact means disposed on release of said brake to partially complete a holding circuit for maintaining said low speed motor energized, additional contact means disposed on energization of said high speed motor to complete said holding circuit, and time delay means operatively connected to said first mentioned contact means for maintaining said holding circuit completed for a predetermined interval of time after said brake is initially applied only when a control function is initated to deenergize said high speed motor and stop the car.

21. In a control system for an elevator car in a hatchway, in combination, a high speed and a low speed motor having driving connection with said car for operating it in the hatchway, means for energizing either of said motors, a brake for holding said car when said motors are deenergized, a releasing winding for said brake, discharge means connected in shunt circuit relation with said winding, and means for increasing the resistance of said discharge means on energization of said high speed motor.

22. In a control system for an elevator car in a hatchway, in combination, a high speed and a low speed motor having driving connection with said car for operating it in the hatchway, means for energizing either of said motors, a brake for holding said car when said motors are deenergized, a releasing winding for said brake, discharge means connected in shunt circuit relation with said winding, means for increasing the resistance of said discharge means on energization of said high speed motor, and means for maintaining the increased resistance condition of said discharge means for a predetermined interval of time after said high speed motor is energized to permit said brake to set rapidly.

23. In a control system for an elevator car in a hatchway, in combination, a high speed motor and a low speed motor having driving connection with said car for operating it in the hatchway, a control switch in the car having an off position and an operating position individual to each motor for selectively effecting the operation of either motor, a brake for holding said car when said motors are deenergized, a releasing winding for said brake, variable resistance discharge means connected in shunt circuit relation with said winding, means for increasing the resistance of said discharge means on operation of said control switch to the position individual to the high speed motor, and means for maintaining the resistance of said discharge means at the increased value for a predetermined time interval after said control switch is operated from the position individual to the high speed motor to the off position.

24. In a control system for an elevator car in a hatchway, in combination, a high speed motor and a low speed motor having driving connection with said car for operating it in the hatchway; a control switch having an off position, a low speed operating position for effecting the energization of said low speed motor, and a high speed operating position for effecting the energization of said high speed motor; a brake for holding said car when said motors are deenergized, a releasing winding for said brake, a plurality of parallel connected resistors connected in shunt circuit relation with said winding to provide a discharge path therefor, normally closed contact means connected in series circuit relation with one of said resistors, means for opening said contact means on operation of said control switch to said high speed position, and means for holding said contact means open for a predetermined time interval after said control switch is operated from said high speed position to said off position to permit said brake to set rapidly.

25. In a control system for an elevator car in a hatchway, in combination, a high speed and a low speed motor having driving connection with said car for individually operating it in the hatchway, means for energizing either of said motors, a brake for holding said car when said motors are deenergized, and means for selectively applying said brake at different rates depending upon whether the high speed motor or the low speed motor is deenergized for immediately stopping said car.

26. In a control system for an elevator car in a hatchway, in combination, a high speed and a low speed motor having driving connection with said car for operating it in the hatchway, a control switch having an off position and a position individual to each motor, and impedance means disposed to be connected in circuit with said low speed motor when said control switch is operated from the high speed position to the low speed position and to be short circuited when said control switch is operated from the off position to the low speed position.

EDGAR M. BOUTON.
HAROLD W. WILLIAMS.